A. A. R. VOGT.
ANIMAL RELEASING DEVICE.
APPLICATION FILED APR. 7, 1920.

1,365,133.

Patented Jan. 11, 1921.

Witnesses
William R. Piper
Paul A. Kiersen

Inventor
A. A. R. Vogt
By H. J. Sanders
Atty

UNITED STATES PATENT OFFICE.

ALFRED A. R. VOGT, OF HILLMAN, MICHIGAN.

ANIMAL-RELEASING DEVICE.

1,365,133.  Specification of Letters Patent.  Patented Jan. 11, 1921.

Application filed April 7, 1920. Serial No. 371,872.

*To all whom it may concern:*

Be it known that I, ALFRED A. R. VOGT, a citizen of the United States, residing at Hillman, in the county of Montmorency and State of Michigan, have invented certain new and useful Improvements in Animal-Releasing Devices, of which the following is a specification.

This invention relates to improvements in animal releasing devices and its object is to provide means for normally retaining a number of animals in a series of stalls and for simultaneously releasing them in time of necessity. Simplicity in construction and efficiency in operation are other objects sought, in mechanism of this nature, by my present invention. With the foregoing and other objects in view the invention consists in the combination and arrangement of parts to be hereinafter fully described, pointed out in the appended claim and illustrated in the accompanying drawing which forms a part of this specification and in which—

Like reference characters denote corresponding parts throughout the several views.

Figure 1:
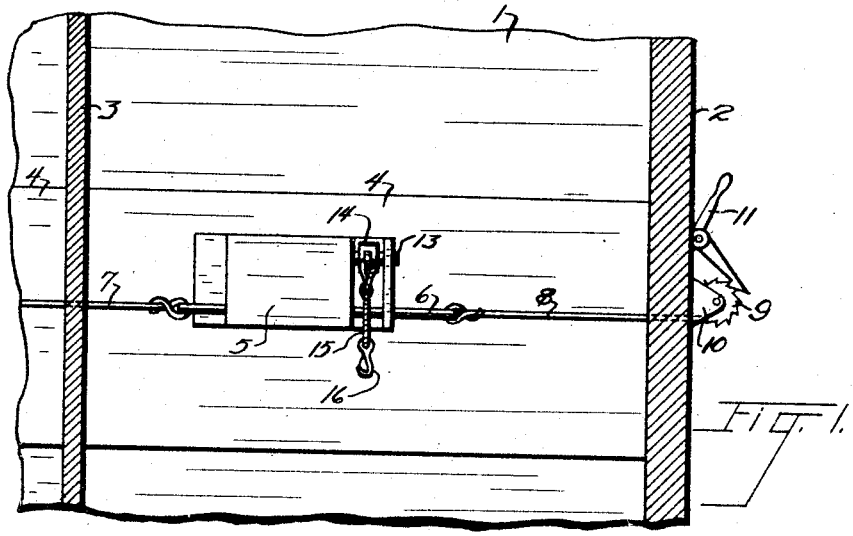
Figure 1 is a fragmentary view of a stable provided with my improved animal releasing device.
Figure 2:
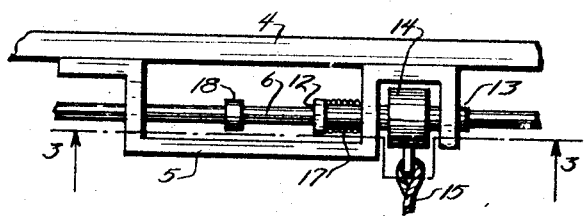
Fig. 2 is an enlarged fragmentary plan view of Fig. 1.

The reference numeral 1 denotes one side wall of a stable, 2 one end wall, 3 a stall partition and 4 the feed trough. To the feed trough within each stall I secure a bracket 5 and through the same a short rod 6 extends, the several rods 6 in the several stalls being connected to each other by fusible links 7 and a fusible link 8 connecting the rod 6 at one end of the barn, through which said fusible link passes, to the shaft of a circular ratchet 9 supported in the bracket 10 secured to the end wall 2, said ratchet 9 being releasably retained in adjusted position by the hand lever 11 fulcrumed to said wall, said hand lever 11 terminating in a tooth adapted for direct engagement with said ratchet. Fast to each rod 6 and concealed by the front wall of the bracket is an upright arm 12 which carries a horizontally disposed extension 13 that extends through the U-shaped end of said bracket to releasably support therewithin the collar 14 to which the hitching rope 15 is secured that carries the snap hook 16 adapted for hitching the animal. An expansion coil spring 17 encircles the said rod 6 and spaces the arm 12 away from the adjacent wall of the U-shaped end of the bracket 5, said spring being normally retained in compressed position with the arm 12 spaced the minimum distance from the U-shaped end of the bracket by means of the ratchet 9 and hand lever 11 aforesaid. A collar 18 also fast to the rod 6 serves to limit the movement of the same in one direction longitudinally of the stall.

Figure 3:
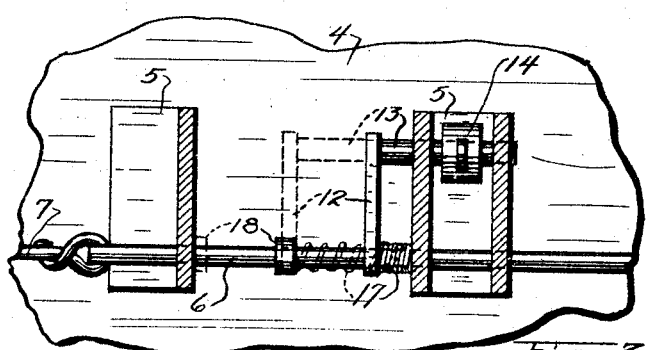
Fig. 3 is a sectional view of Fig. 2 taken on line 3—3 of that figure.

The normal position of the mechanism is shown in all figures except in the dotted position in Fig. 3. When it is desired to release all of the animals simultaneously the toothed end of the hand lever 11 is manually raised out of engagement with the circular ratchet 9 when the several springs 17 will move the several rods 6 longitudinally of their stalls thus withdrawing the arm-extensions 13 from the U-shaped ends of the brackets 5 and detaching the collars 14 freeing the animals. One animal at a time is released by unhitching the snap hook 16 in the usual manner. The device is re-assembled by applying a wrench to the square end of the ratchet shaft and rotating the same to wind the fusible link 8 thereupon, meanwhile the several collars 14 being again applied to the arm-extensions 13. In the event of fire in any stall the fusible link will be burned and one or more of the rods 6 moved into inoperative position.

What is claimed is:—

In an animal releasing device, a plurality of brackets each having one U-shaped end, rods slidably arranged in said brackets, fusible links connecting said rods, arms fast to said rods, means for yieldingly spacing said arms the maximum distance away from the U-shaped ends of said brackets, arm-extensions normally extending through the U-shaped ends of said brackets, collars carried by said arm-extensions while in normal position, and manually controlled means for retaining said rods in a predetermined position with relation to said brackets.

In testimony that I claim the foregoing as my own I have hereto affixed my signature in the presence of two subscribing witnesses.

ALFRED A. R. VOGT.

Witnesses:
 THOS. A. TAKE,
 PAUL ELOWSKI.